Patented Dec. 22, 1953

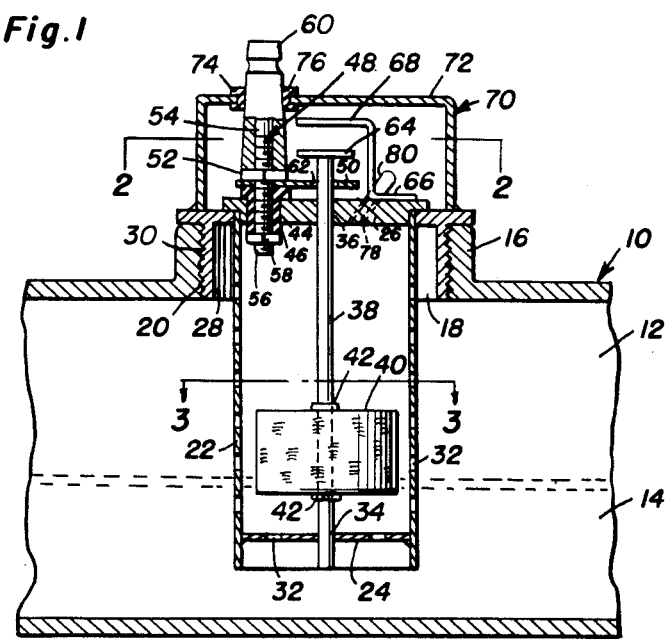

2,663,772

UNITED STATES PATENT OFFICE 2,663,772

FLOAT SWITCH

Robert J. Cochrane, Redlands, Calif., assignor of fifty per cent to Thomas E. Wolfrom, Redlands, Calif.

Application February 14, 1952, Serial No. 271,589

4 Claims. (Cl. 200—84)

This invention relates in general to a hydraulic fluid indicator, and more specifically to an indicator for warning the operator of a vehicle that the level of the hydraulic fluid within the reservoir of a master brake cylinder of the vehicle is low.

In this day and age, nearly all vehicles in use are provided with hydraulic brakes which require a supply of hydraulic fluid within a reservoir carried by the hydraulic master brake cylinder. After the brakes have been used for a period of time, it is impossible to tell whether the brakes need adjusting or whether the supply of hydraulic fluid within the reservoir is low when the foot brake pedal approaches the floor boards of the vehicle as the brakes are applied. Unfortunately, if hydraulic brake fluid is being lost through minor leaks in the brake lines or other parts of the brake system, the operator of the vehicle will suddenly find the reserve supply of hydraulic fluid no longer exists and that he has no brakes. This often happens when it is absolutely necessary for the braking of a car in cases of emergency and results in serious accidents.

The primary object of this invention is to provide a hydraulic fluid indicator which may be attached to a master brake cylinder for indicating the level of the hydraulic brake fluid within the reservoir carried by said master brake cylinder.

Another object of this invention is to provide an improved hydraulic fluid indicator having contacts therein for completing an electric circuit for lighting a light on the dashboard of a vehicle whereby a dangerous level of hydraulic brake fluid within the reservoir of the master brake cylinder may be indicated.

Another object of this invention is to provide an improved hydraulic fluid indicator for insertion in the reservoirs of master brake cylinders, said indicator being provided with electrical contacts which are completely sealed within a housing carried by the indicator.

Another object of this invention is to provide an improved hydraulic fluid indicator which is adapted to be inserted within the reservoir of a master brake cylinder for indicating the level of hydraulic brake fluid therein, said indicator being of a compact and simplified construction whereby it may be economically manufactured.

A further object of this invention is to provide an improved hydraulic brake fluid indicator which is compact and of a small size whereby it may be threaded into the filler opening of a reservoir of a hydraulic master brake cylinder in lieu of a closure nut normally provided therefor.

With these objects definitely in view, this invention resides in certain novel features of construction, combination and arrangement of elements and portions as will hereinafter be described in detail in this specification, particularly pointed out in the appended claims, and illustrated in the accompanying drawings which form a material part of this application, and in which:

Figure 1 is a partial transverse vertical sectional view through a reservoir of a master brake cylinder, said reservoir having secured therein a hydraulic brake fluid indicator, which is the subject of this invention, the fluid indicator being also shown in section in order to clearly illustrate the component parts thereof;

Figure 2 is a transverse horizontal sectional view taken substantially upon the plane indicated by the section line 2—2 of Figure 1 and showing the arrangement of the contacts within the closure portion of the indicator; and Figure 3 is a transverse horizontal sectional view taken substantially upon the plane indicated by the section line 3—3 of Figure 1 and showing the manner in which a float is adjustably secured to a float rod, and the relationship of the float with the tubular housing in which it is disposed.

Similar characters of reference designate similar or identical elements and portions throughout the specification and throughout the different views of the drawings.

Referring now to the drawings in detail, it will be seen that in Figure 1 there is illustrated a portion of a reservoir of a hydraulic master brake cylinder, said reservoir being referred to, in general, by the reference numeral 10. The reservoir 10 has a hollow interior 12 in which is stored hydraulic brake fluid 14 for pumping to individual brake cylinders of a vehicle on which the hydraulic brake cylinder is secured. The reservoir 10 is provided on its upper wall with an annular upstanding flange 16 having a bore 18 therethrough communicating through the wall of the reservoir with the hollow chamber 12. The annular flange 16 is internally threaded as indicated by the reference numeral 20.

The bore 18 forms the filler opening for the reservoir 10 and is normally closed by a closure nut (not shown) threadedly engaged with the threaded portion 20 of the annular flange 16.

The hydraulic fluid indicator, which is the subject of this invention, includes a tubular housing portion 22 having a lower cover plate 24 mounted therein and secured thereto adjacent the lower end. The upper end of the tubular housing 22 is secured to an upper cover plate 26 of a greater diameter than the diameter of the tubular housing 22. The upper cover plate 26 is provided with a downwardly extending annular flange 28 concentric with the tubular housing 22 and spaced therefrom. The exterior of the annular flange 28 is threaded as indicated by the reference numeral 30. The threaded portion 30 of the annular flange 28 is threadedly engaged with the threaded portion 20 of the annular flange 16 of the reservoir 10 whereby said upper cover member 26 forms a closure for the filler opening 18.

When the upper closure 26 is engaged within the annular flange 16, the lower end of the housing 22 is disposed within the hydraulic brake fluid 14 carried in the reservoir 10. The side walls of the tubular housing 22 and its lower cover 24 are provided with a plurality of apertures 32 through which the hydraulic brake fluid 14 is permitted to flow so that the level of the hydraulic brake fluid within the tubular housing 22 is the same as the level of the fluid on the outside thereof. Provided in the lower cover 24 and the upper cover 26 are aligned bores 34 and 36, respectively. Slidably mounted in the bores 34 and 36 is a float rod 38 on which is mounted a float 40. The float 40 is formed of cork or other hydraulic brake fluid resistant material, or it may be in the form of a hollow metal container. The float 40 is intended to float on the surface of the hydraulic brake fluid 14 and reciprocatingly move the float rod 38 in the bores 34 and 36. The float 40 is adjustably secured to the float rod 38 by a pair of spring washers 42 which tightly engage the float rod 38 and bear against the upper and lower faces of the float 40. The float 40 may be adjustably positioned on the float rod 38 by sliding both the float 40 and the spring washers 42 thereon to the desired position.

The upper cover 26 is provided with an opening 44 to one side of the bore 36. Positioned within the opening 44 is an insulating bushing 46 which is tubular and has received therein the lower end of a bolt 48. Mounted on the bolt 48 and bearing against the upper surface of the insulating bushing 46 is a fixed contact 50. It will be noted that the bolt 48 has an intermediate head portion 52 and lower threaded shank portions 54 and 56, respectively. The fixed contact 50 is clamped against the upper surface of the tubular bushing 46 by the head portion 52 bearing thereagainst due to pressure exerted by a nut 58 threadedly engaged on the lower end of the threaded shank portion 56 and engaging the lower face of the tubular bushing 46. Carried by the upper threaded portion 54 of the bolt 48 is a wire engaging terminal portion 60.

It will be noted that the fixed contact 50 is provided with an enlarged opening 62 in which is guidingly received the float rod 38 in insulated relation. Carried at the upper end of the float rod 38 is a movable contact 64 which will engage the fixed contact 50 when the float 40 has moved downwardly due to the lowering of the level of the hydraulic brake fluid 14 within the reservoir 10. While it has not been illustrated, it is the intent of this invention that a wire connected at one end to an ignition switch of an automobile be secured to one terminal of a bulb carried on the dash of a vehicle, and that a second wire be connected to the other terminal of the bulb and extend therefrom to the terminal 60. It is readily apparent that when the float 40 has moved downwardly sufficiently for the movable contact 64 to engage the fixed contact 50, that the wire connected to the terminal 60 is grounded through the reservoir 10 and that the circuit to the bulb mounted on the dash is complete. When the circuit to the bulb is completed, the bulb lights and indicates that the level of the hydraulic brake fluid 14 within the reservoir 10 is low, and that the supply should be replenished. The purpose of connecting the bulb into the ignition key circuit is to permit the bulb to be lit only when the ignition key is on thereby preventing the running down of the battery due to the burning of the bulb.

Also secured to the upper cover 26 is a V-shaped stop member having a lower flange 66 secured to the upper surface of the upper cover 26. The stop member also has an upper flange 68 which is parallel to the lower flange 66 and overlies the fixed contact 50 and the float rod 38. The purpose of the stop member is to have the movable contact 64 engage the upper flange 68 to limit upward movement of the float rod 38 and its associated float 40.

The contacts and the stop member are encased within a closure 70 which has the general shape of a hollow nut and is secured at its lower edge to the upper closure 26. The closure 70 is provided with a flat upper wall 72 in which is provided an aperture 74 in alignment with the aperture 44 in the upper cover 26. Mounted within the aperture 74 is a tubular bushing 76 formed of an insulating material. Received within the tubular bushing 76 in sealed relation to the closure 70 is the terminal 60.

The upper cover 26 is provided with a bore 78 in which is secured the lower end of a tube 80 which extends through an aperture in the closure 70. The purpose of the tube 80 is to communicate the interior of the reservoir 10 with the atmosphere so that air may enter the reservoir 10 to replace any hydraulic brake fluid 14 which may be lost. It is obvious that such a vent is necessary or a vacuum would be set up within the reservoir and the float 40 would not function properly.

Since the closure 70 is in the form of a hollow nut, the hydraulic fluid indicator may be easily threaded in and out of the filler opening 18 by engaging a wrench on the closure 70 and turning the indicator.

In view of the foregoing, it is believed that the construction and operation of the hydraulic fluid indicator described herein will be readily understood and further description is unnecessary. Minor modifications of the hydraulic fluid indicator, varying in minor details from the embodiment of the indicator illustrated and described herein, may be resorted to without departure from the spirit and scope of this invention, as defined in the appended claims.

Having described the invention, what is claimed as new is:

1. A brake fluid level indicator comprising a switch mechanism for insertion into a hydraulic master brake cylinder reservoir in lieu of a filler opening closure nut, said switch including a fixed contact and a movable contact, said movable contact being secured to an upper end of a float rod, a float carried by a lower portion of said float rod, said switch including a tubular housing having upper and lower cover plates, said float rod being slidably journaled through said cover plates, said float being mounted for vertical movement within said housing, fluid entrance holes in said housing.

2. A brake fluid level indicator comprising a switch mechanism for insertion in a hydraulic master brake cylinder reservoir in lieu of a filler opening closure nut, said switch including a fixed contact and a movable contact, said movable contact being secured to the upper end of a float rod, said switch including a tubular housing having upper and lower cover plates, said float rod being slidably journaled through said cover plates, a float carried by said float rod being mounted within said tubular housing, fluid entrance holes in said housing, said contacts being positioned above said upper cover and sealed within a closure secured to said upper cover, said closure being in the form of a hollow nut whereby the indicator may be easily rotated by wrench means.

3. The brake fluid level indicator of claim 1, wherein said switch includes a hollow cover overlying and secured to said upper cover plate, a single terminal post mounted on said upper cover plate and extending through said cover in insulated relation, a fixed contact carried by said terminal post intermediate its ends and underlying said movable contact.

4. The brake fluid level indicator of claim 1, wherein said switch includes a hollow cover overlying and secured to said upper cover plate, a single terminal post mounted on said upper cover plate and extending through said cover in insulated relation, a fixed contact carried by said terminal post intermediate its ends and underlying said movable contact, said float rod passing through an opening in said fixed contact.

ROBERT J. COCHRANE.

References Cited in the file of this patent

UNITED STATES PATENTS

| Number | Name | Date |
|---|---|---|
| 829,103 | Dixon | Aug. 21, 1906 |
| 1,326,578 | Curtis | Dec. 30, 1919 |
| 1,509,998 | Geiger et al. | Sept. 30, 1924 |
| 1,719,078 | Papashvili | July 2, 1929 |
| 2,161,441 | Vickers | Jan. 6, 1939 |
| 2,191,216 | Mendez | Feb. 20, 1940 |

FOREIGN PATENTS

| Number | Country | Date |
|---|---|---|
| 683,935 | Germany | Nov. 18, 1939 |